Sept. 29, 1936.  A. L. VAUGHN  2,055,712
SIGNAL LIGHT
Filed July 12, 1935

INVENTOR.
ARTHUR L. VAUGHN.
BY
ATTORNEY.

Patented Sept. 29, 1936

2,055,712

UNITED STATES PATENT OFFICE 2,055,712

SIGNAL LIGHT

Arthur L. Vaughn, Long Beach, Calif.

Application July 12, 1935, Serial No. 31,004

2 Claims. (Cl. 177—329)

This invention relates to a novel signal light attachable to a door or body of a vehicle whereby a ray of light can be projected upon the operator's arm when a signal is given.

An object of my invention is to provide a novel signal light which is simple in construction and inexpensive to manufacture.

Another object is to provide a signal light which is inconspicuous when placed on a vehicle and which conforms in design to other ornaments upon the vehicle.

Still another object is to provide a novel signal light which is readily disassembled for repairs; and also one in which the light beam can be adjusted to throw the light to the area desired.

Other objects, advantages and features of invention may appear from the accompanying drawing, the subjoined detailed description and the appended claims.

In the drawing

Figure 1:
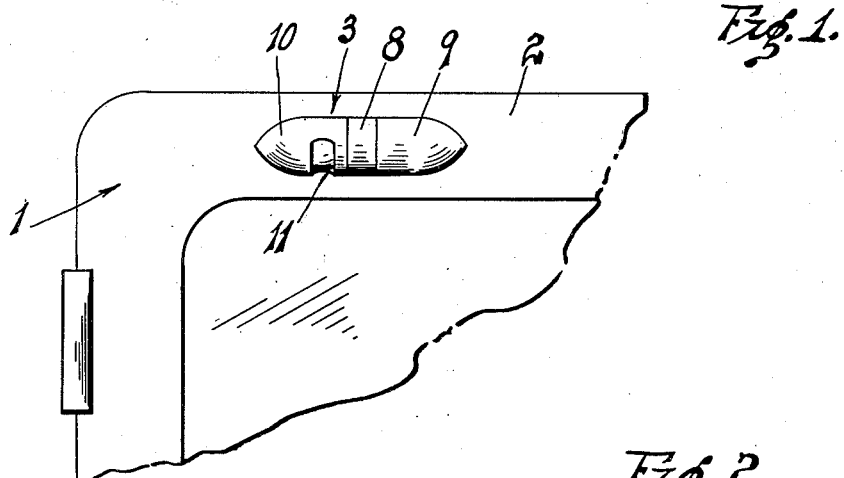
Figure 1 is a side elevation of my signal light in position on a vehicle door.
Figure 2:
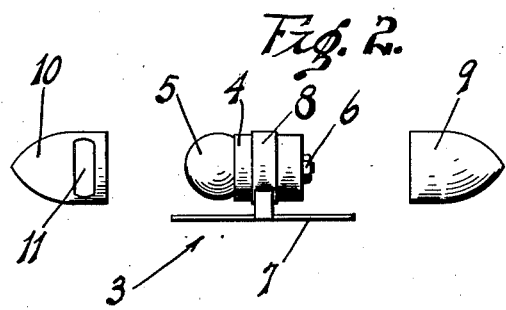
Figure 2 is a disassembled side elevation of my signal light.

Referring more particularly to the drawing, while I have here shown the signal light attached to a vehicle door, it is obvious that it may be placed above the door on the body of the vehicle.

Figure 3:
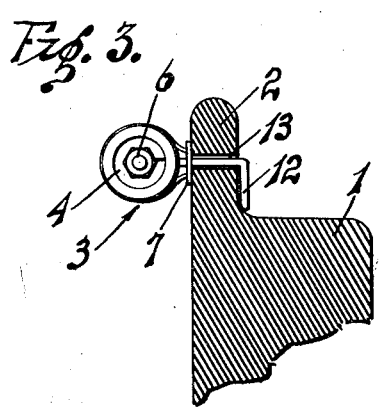
Figure 3 is an end view of the signal light in position on a door, the door being shown in section, and the cap being removed.
Figure 4:
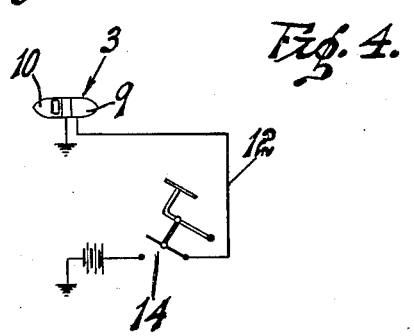
Figure 4 is a wire diagram of my light as installed in a vehicle.

The numeral 1 indicates a door which is provided with the usual flange 2 on the top thereof. My light 3 is mounted on the upper part of the door, substantially as shown in Figs. 1 and 3, and is preferably placed so that the longitudinal axis of the light is horizontal.

My light consists of a base and socket 4 which receives the light bulb 5 in one end, the other end being provided with a cord terminal 6. A mounting bracket 7 is attached to the base 4, preferably by means of a ring 8 which encircles the base. A cap 9 is removably mounted on one end of the base 4, and preferably is slidably fitted on the base. A hood 10 is also slidably fitted on the other end of the base and may be rotated on the base for a purpose to be further described.

A slot 11 is provided in the hood 10 thru which the light shines from the bulb 5. By rotating the hood, the slot 11 can be moved so that the beam of light can be directed to the point desired.

When mounted on a door, the wire 12—which extends from the terminal 6—is passed thru a drilled hole 13 in the flange 2. This wire then extends to a suitable connection or a hinge of the door and thence to a switch 14 which is operated by the clutch or brake pedal.

Both the cap 9 and the hood 10 are tapered at their outer end so that the signal light, when assembled, is pleasing in appearance and is relatively inconspicuous on the vehicle and also conforms to the various ornaments usually placed on the modern vehicle. The slot 11 permits the beam of light from the bulb 5 to be directed to the point desired so that the arm of the operator will be illuminated while giving a signal.

Having described my invention, I claim:

1. A signal light comprising a base, a light bulb mounted in one end of the base, a cap slidably fitted over one end of the base, a hood slidably fitted over the other end of the base, said hood having a slot therein thru which light from the bulb passes, said hood being rotatable on the base, and a mounting bracket attached to the base.

2. A signal light comprising a base, a cap removably mounted on one end of the base, a light bulb mounted in the base, a hood slidably mounted on the base and enclosing the light bulb, said hood having a slot formed therein thru which light from the bulb passes, a mounting bracket fixedly attached to the base, said hood and cap each being tapered at the outer end thereof.

ARTHUR L. VAUGHN.